June 1, 1954

C. N. BREWER 2,679,902

AUXILIARY KEYBOARD AND OPERATING MECHANISM FOR TYPESETTING, TYPECASTING, MESSAGE TRANSMISSION, TAPE PERFORATING, AND SIMILAR MACHINES

Filed April 7, 1953

4 Sheets-Sheet 1

INVENTOR

CLAIRE N. BREWER

BY Scrivener & Parker

ATTORNEYS

INVENTOR
CLAIRE N. BREWER

BY Scrivener & Parker
ATTORNEYS

June 1, 1954

C. N. BREWER 2,679,902

AUXILIARY KEYBOARD AND OPERATING MECHANISM FOR TYPESETTING, TYPECASTING, MESSAGE TRANSMISSION, TAPE PERFORATING, AND SIMILAR MACHINES

Filed April 7, 1953

4 Sheets-Sheet 3

INVENTOR

CLAIRE N. BREWER

BY Scrivener & Parker

ATTORNEYS

June 1, 1954

C. N. BREWER 2,679,902

AUXILIARY KEYBOARD AND OPERATING MECHANISM FOR TYPESETTING, TYPECASTING, MESSAGE TRANSMISSION, TAPE PERFORATING, AND SIMILAR MACHINES

Filed April 7, 1953

4 Sheets-Sheet 4

INVENTOR

CLAIRE N. BREWER

BY Scrivener & Parker

ATTORNEYS

Patented June 1, 1954

2,679,902

UNITED STATES PATENT OFFICE 2,679,902

AUXILIARY KEYBOARD AND OPERATING MECHANISM FOR TYPESETTING, TYPECASTING, MESSAGE TRANSMISSION, TAPE PERFORATING, AND SIMILAR MACHINES

Claire N. Brewer, Huntington, W. Va., assignor to Unitypo, Inc., Indianapolis, Ind., a corporation of New York Application April 7, 1953, Serial No. 347,316

17 Claims. (Cl. 164—113)

This application is a continuation-in-part of my co-pending application Serial No. 344,377, filed March 24, 1953.

This invention relates broadly to the operation of keyboards of machines which are used in the art of typecasting, typesetting and the transmission of messages, such as, for example: machines which perforate tape which is used in the operation of typesetting or typecasting machines or the sending of messages, typewriting machines, electro-typesetters, Photon machines, machines for the automatic electrical control of typesetting or typecasting machines, Varitype machines, machines for typing matter from which any printing plates are made, and the like. While the invention is useful in the operation of the keyboards of such, and similar, machines, it will be particularly described in this application in connection with, and as applied to, a machine which perforates tape which is used in the operation and control of a typesetting or typecasting machine such as the Linotype, Intertype and Monotype machines.

It has, for many years, been the general practice in the printing art to cast and set type by the use of machines such as the Linotype. Such machines are equipped with a special keyboard usually having ninety keys, although sometimes a greater and sometimes a smaller number of keys are provided, and the operation of such machines must be performed by highly skilled personnel who are able to operate the special keyboard and perform other duties essential to the most efficient operation of these very complex machines.

It has heretofore been proposed to operate such typecasting machines by means of a perforated tape prepared on a machine having a keyboard which corresponds to the standard typewriter keyboard with the addition of certain keys for performing operations and producing characters which are necessary in printing but not in typewriting. Such machines are now available commercially, a typical one being known as the Teletypesetter. It has been found, however, that the over-all efficiency and cost of typecasting with the use of such auxiliary tape-perforating machines are less favorable than the efficiency and cost of operation with the use of skilled Linotype operators who are particularly skilled in the operation of typecasting machines having the standard Linotype keyboard. The use of machines for perforating tape for the operation of typecasting machines has become widespread, however, and it will be apparent that further and very important advantages would be produced in the over-all efficiency and costs of a printing plant by the operation of such machines by skilled operators having knowledge of the entire typecasting, typesetting and printing operations and, particularly, being skilled in the use of the standard Linotype keyboard.

It has therefore been the primary object of the invention, which is achieved by the means, systems and methods disclosed in this application, to provide a means, including a keyboard having keys positioned and arranged substantially as in a standard Linotype machine keyboard, for association with a tape-perforating machine, such as the Teletypesetter, having a modified standard typewriter keyboard, which will, upon operation of the keys of the machine keyboard provided by this invention, actuate the keys of the tape-perforating machine to perforate the tape in the normal manner of operation of the tape-perforating machine, but improved by reason of this invention.

A further principal object of the invention has been to provide, in combination with a tape-perforating machine in the operation of which a shift key or an unshift key is depressed to cause holes to be punched in the tape corresponding to upper case or lower case characters, means for operating such shift and unshift keys upon depression, respectively, of the upper case or lower case keys of the keyboard of this invention, in which there are separate upper case and lower case keys.

One of the principal objectives and results of this invention is, therefore, to enable operators with knowledge of Linotype machine keyboards to produce perforated tape on a standard tape-perforating machine having a modified conventional typewriter keyboard, without first being trained in the manipulation of the modified typewriter keyboard, thus enabling the Linotype machine operator to perform in his usual manner.

Other objects and features of this invention, as well as the means of achieving them, will be apparent from the following description and the annexed drawings which, it will be understood, are only illustrative of the invention and impose no limitations thereon not imposed by the appended claims.

In the drawings forming part of this application,

Figure 1:
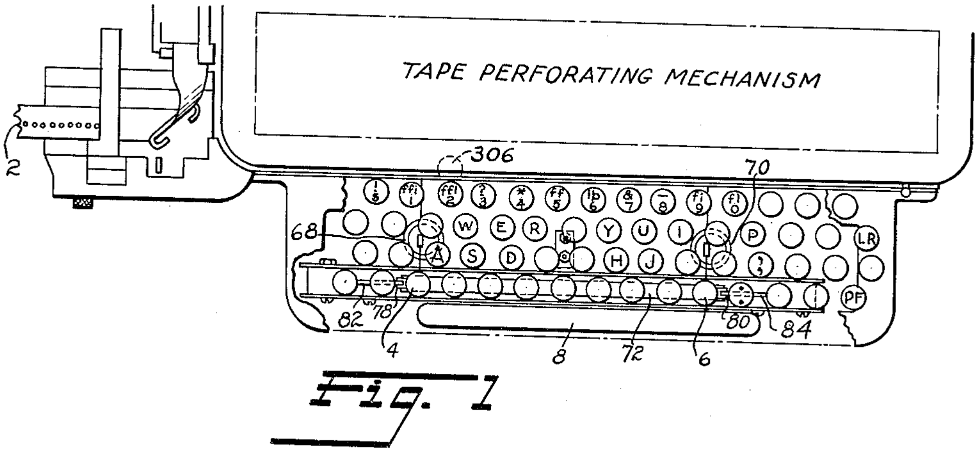
Figure 1 is a top view of the keyboard and part of the tape mechanism of a conventional tape-perforating machine, such as the Teletypesetter, showing also certain parts and devices added thereto as a part of this invention.

Fig. 1 of the drawings illustrates the keyboard of a machine which perforates a tape 2 with holes arranged in a characteristic pattern for each character key. This keyboard has all of the character keys of the conventional typewriter keyboard, arranged in the same positions, and also has additional character keys which are required for printing but are not required for typewriting. In addition, this keyboard has a shift key 4 and an unshift key 6 which, when operated, produce characteristic tape perforations which cause the typesetting machine operated and controlled by the tape to set upper case or lower case characters corresponding to subsequent tape perforations, depending on which of the shift and unshift keys has been operated. Thus, for example, operation of the "A" key will always produce the same characteristic tape perforation, but the typesetting machine controlled and operated by the tape will cast and set an upper case "A" or a lower case "a" depending on whether the shift or unshift key was last operated prior to operation of the "A" key. Certain of the keys have upper and lower characters on them, which are referred to as upper and lower case characters, respectively. If such a key is operated after operation of the shift key and before operation of the unshift key a characteristic tape perforation corresponding to the upper case character is produced, while operation of such a key after operation of the unshift key but before operation of the shift key produces a characteristic tape perforation corresponding to the lower case character on the key. Others of the keys, when operated, produce the same perforation and cause the same operation of the tyepsetting machine regardless of whether the shift or unshift key has been previously operated. The keyboard is also provided with a space band bar 8 which, when operated, produces a characteristic tape perforation which causes the typesetting machine controlled by the tape to cast and set a "space." It will be apparent that in the operation of a typesetting machine by means of a tape produced on a machine such as that described, an upper case or a lower case character will be cast and set by each tape perforation corresponding to one of the characters on the keyboard, and will be upper or lower case depending on whether the shift or unshift key was last operated.

Figure 2:
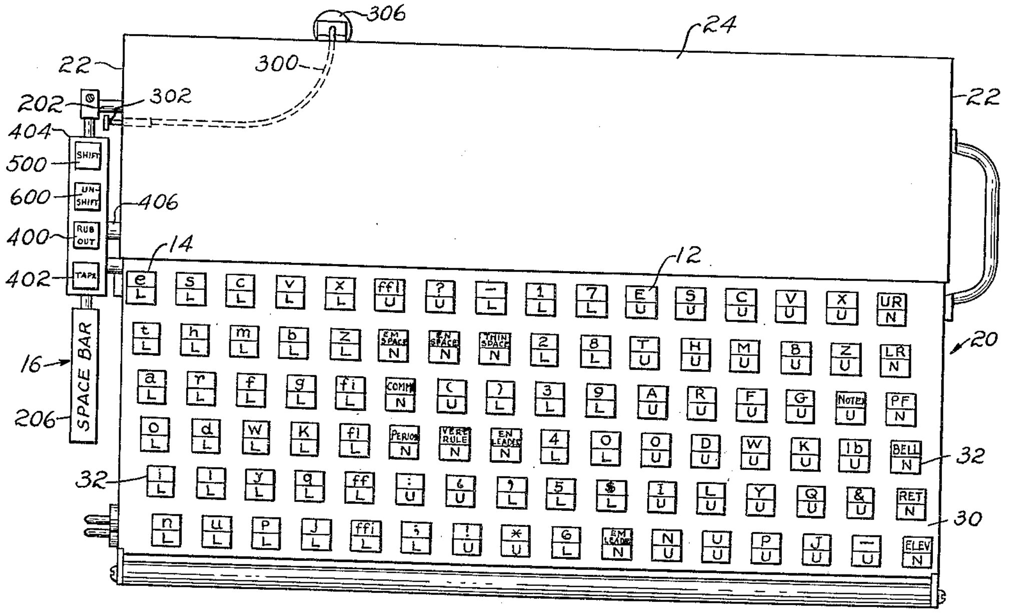
Figure 2 is a top view of a cover and frame provided by my invention for association with the keyboard of a tape-perforating machine.
Figures 3, 4:
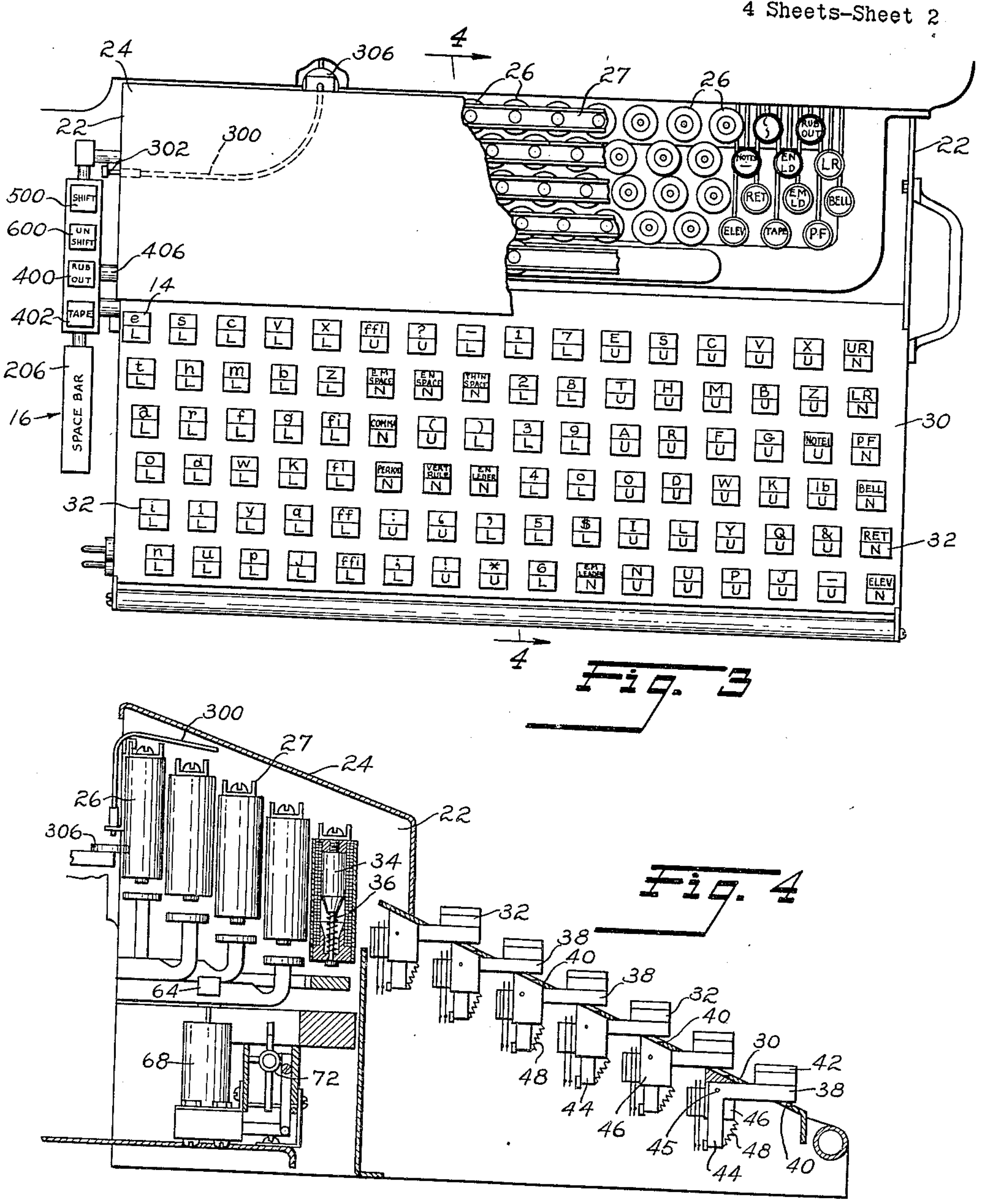
Figure 3 is a top view, with some parts broken away, showing the cover and frame illustrated in Fig. 2 superimposed on the keyboard of Fig. 1 in accordance with the invention.
Figure 4 is a cross-sectional view taken on line 4—4 of Figure 3.

In Figs. 2, 3 and 4 of the drawings, there is illustrated apparatus provided by this invention including a keyboard having keys arranged in the same positions as those of the standard keyboard of a type-casting machine, such as a Linotype machine, with certain keys added thereto by this invention to adapt the same to the operation of certain special devices of the tape-perforating machine which is described above. In this keyboard which may be referred to hereafter as the Linotype keyboard or the keyboard provided by this invention, the upper and lower cases of each character are represented on separate keys instead of on a single key as in the tape-perforating machine. For example, there is an upper case "E" key 12 and a separate lower case "e" key 14. In addition, there are separate keys for various characters such as punctuation marks, etc., some of which are lower case and some of which are upper case on the tape-perforating machine and consequently, on that machine, require depression of the shift key or the unshift key before any of these may be operated to produce the desired character. In addition, there are other keys on the Linotype keyboard which correspond to keys on the tape-perforating machine which cause the same character to be cast and set regardless of whether the shift key or unshift key has been previously depressed. These are referred to as the no-shift keys of the Linotype keyboard and are marked with the letter N meaning "no-shift." The keys of the Linotype keyboard which correspond to the upper case characters which are cast and set by tape perforations occurring after a shift key tape perforation produced by the tape-perforating machine are marked with the letter U, referring to "upper case." The keys of the Linotype keyboard which correspond to the lower case characters which are cast and set by tape perforations occurring after an unshift key perforation produced by the tape-perforating machine are marked with the letter L, referring to "lower case." In addition, the Linotype keyboard illustrated in Fig. 2 includes a space band lever 16.

The keyboard of the conventional tape-perforating machine of Fig. 1 is positioned at the front of the machine and in accordance with my invention I provide an enclosing and supporting structure 20 having side walls 22, which is shaped to provide a relatively high rear chamber part which fits over the keyboard of the tape-perforating machine and has a cover 24 and is of such size that its side walls closely fit the sides of the keyboard of the tape-perforating machine while the cover 24 is positioned sufficiently above the keys of the tape-perforating machine keyboard to permit a plurality of vertically arranged solenoids 26 to be positioned within the structure 20 beneath the cover 24, with the lower end of each one sufficiently above the upper surface of one of the keys of the tape-perforating machine keyboard to permit the downward movement of the plunger of the solenoid to operate the key below it upon energization of the solenoid. As shown, a solenoid is provided for each key of the tape-perforating machine keyboard and, in the disclosed embodiment, these are supported on U-shaped channel bars 27 which extend across the enclosing and supporting structure 20 and are suitably supported thereby, preferably by attachment at their ends to the side walls 22. A keyboard base plate 30 is provided as a part of this structure 20 and is inclined downwardly and forwardly from the part thereof which covers the keyboard of the tape-perforating machine and supports the solenoids 26. The keyboard base 30 is preferably a flat sheet of metal and supports the keys 32 which substantially correspond in number and arrangement to the keys of a conventional Linotype keyboard as described above. The plunger 34 of each solenoid 26 is normally held in a raised position out of engagement with the key below it by a spring 36 and upon energization of the solenoid winding is moved downwardly against the force of the spring into engagement with the key of the tape-perforating machine which is below it to depress such key and cause a corresponding and pre-determined perforation of the tape 2.

Each of the keys 32 of the keyboard of this invention comprises a part of right-angular shape, one arm 38 of which extends in a generally horizontal direction through a slot 40 in the keyboard base 30 and has a flat part 42 on its upper surface for engagement by the finger of the operator, while the other arm 44 extends vertically below the keyboard and is pivotally connected at 45 to a block 46 which is supported on the lower side of keyboard base plate 30. A separate slot 40 is provided for each key and the lower, or forward, edge of each slot is entirely under the corresponding end of horizontal arm 38 of the key which extends through it whereby, when the key is depressed, the lower surface of such arm will strike the keyboard base adjacent the forward end of the slot, thus providing a positive stop for the downward movement of the key. The lower end of each arm 44 is connected by a spring 48 to the forward face of the associated block 46 whereby the key is normally held in raised position and is depressed against the force of the spring.

Means are provided by the invention for operating the keyboard of the tape-perforating machine through the medium of the keys of the superimposed keyboard of this invention. It should be noted here that in the usual operation of the tape-perforating machine keyboard, if the shift or unshift key is depressed and immediately released, the tape 2 will be given a characteristic "shift" or "unshift" perforation. The subsequent operation of any key of the keyboard of the tape-perforating machine will produce a tape perforation which is always the same but which will cause the typesetting machine to cast and set an upper or lower case character, depending on which of the shift or unshift keys has been previously operated. On the contrary, as stated before, the keyboard of this invention, as is conventional with Linotype machine keyboards, has separate keys for the upper and lower case of each character, and the means for coordinating these two different modes of operation form an important part of my invention.

Figure 5:
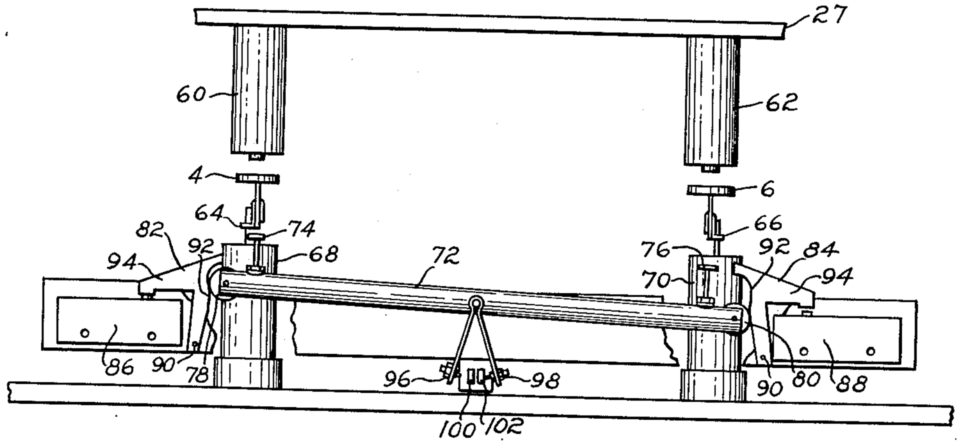
Figure 5 is a front view of the shift and unshift key operating mechanism shown in Fig. 1.

Means are therefore provided by this invention which are operable upon depression of any upper case character key of the superimposed keyboard provided by this invention to first cause the shift key of the tape-perforating machine to be depressed and then immediately released, thus producing the characteristic "shift" tape perforation, and then to cause the corresponding letter key of the tape-perforating machine keyboard to be depressed to produce its characteristic tape perforation. These means also are operable upon depression of any lower case character key of the superimposed keyboard to first cause the unshift key of the tape-perforating machine to be depressed and then immediately released, thus producing the characteristic "unshift" tape perforation and then to cause the corresponding letter key of the tape-perforating machine keyboard to be depressed to produce its characteristic tape perforation. These means also are operable, upon depression of any key of the superimposed keyboard bearing a character corresponding to a key of the tape perforating machine which produces a tape perforation causing setting and casting of the same character regardless of whether the shift or unshift key has been previously operated, to cause the corresponding key of the tape-perforating machine keyboard to be operated. These described means form an important part of my invention and are disclosed in Figs. 1, 5 and 6, and comprise solenoids 60 and 62 which are, respectively, positioned above the shift and unshift keys 4, 6 and the plungers of which are normally held in raised positions by springs (not shown but see Fig. 4). Energization of either of these solenoids causes the plunger thereof to be moved downwardly to depress the key beneath it. As shown in Fig. 5, additional solenoids 68, 70 may be positioned below the shift and unshift keys, respectively, to provide additional power for the operation of these keys if this is desired or necessary. The upper ends of the plungers of solenoids 68, 70, if these are provided, are connected to the shift and unshift keys, respectively, through lost-motion connections 64, 66 which permit manual operation of these keys. An elongated rod 72 is pivotally mounted at its center beneath the keyboard of the tape-perforating machine with its end parts beneath the shift and unshift keys and has upwardly extending parts 74, 76 on its upper surface positioned, respectively, beneath the shift and unshift keys, so that depression of either key, as by operation of one of the solenoids 60, 62, will depress the corresponding end of the rod 72. Rollers 78, 80 are mounted on the respective ends of rod 72 and respectively engage cam surfaces formed on members 82, 84 which have parts which are respectively in operative engagement with micro-switches 86, 88. Each of the cams 82, 84 is pivoted at its lower end at 90 and the cam surface thereof which is contacted by the roller extends generally vertically and is indented, as shown at 92, from the upper part thereof, which is engaged by the roller at the upper limit of its movement, downwardly to a point just above the pivot 90. Each of the cam members 82, 84 is provided with an arm 94 which extends in a direction away from the roller-engaging cam surface thereof and which engages the operating contacts of the associated micro-switch 86 or 88 as the cam is moved about its pivot. Abutment members 96, 98 are mounted on the lower surface of the rod 72 at opposite sides of its central pivotal support and are positioned adjacent to, and on opposite sides of, two contact members 100, 102 which are mounted on flexible supports and are insulated from each other. These contact members are separated when the rod is in or adjacent its horizontal position but are closed by pressure of one or the other of the abutment members 96, 98 as the rod reaches the limit of its movement in a clockwise or counter-clockwise direction.

In the mechanical operation of the described parts, depression of the unshift key, either manually or by operation of the solenoid 62, will cause the key to engage the upwardly-extending part 76 on rod 72, thereby moving the rod in a clockwise direction about its pivot to depress the end thereof under the unshift key and raise the end which lies below the shift key. As the rod moves from its extreme counter-clockwise position to its extreme clockwise position, abutment member 96 moves away from contact 100, permitting contacts 100, 102 to separate, opening the electrical circuit of which they are a part. As the rod approaches the limit of its movement in a clockwise direction, abutment member 98 engages contact 102 and moves it into engagement with contact 100, thereby closing the circuit in which these contacts are included. At the same time, the roller 80, having been moved downwardly by the pivotal movement of rod 72, will move out of the recessed upper part 92 of cam 84 into engagement with the unrecessed lower part thereof, thus moving the cam in a counter-clockwise direction about its pivot and opening the circuit through the micro-switch 88. Simultaneously, the end of rod 72 beneath the shift key 4 will be moved upwardly, causing the roller 78 to move into the recessed upper part of cam 82 to cause operation of the micro-switch 86 to close the circuit through it. The electrical circuits, and the operation thereof, will be described hereinafter.

Figure 6:
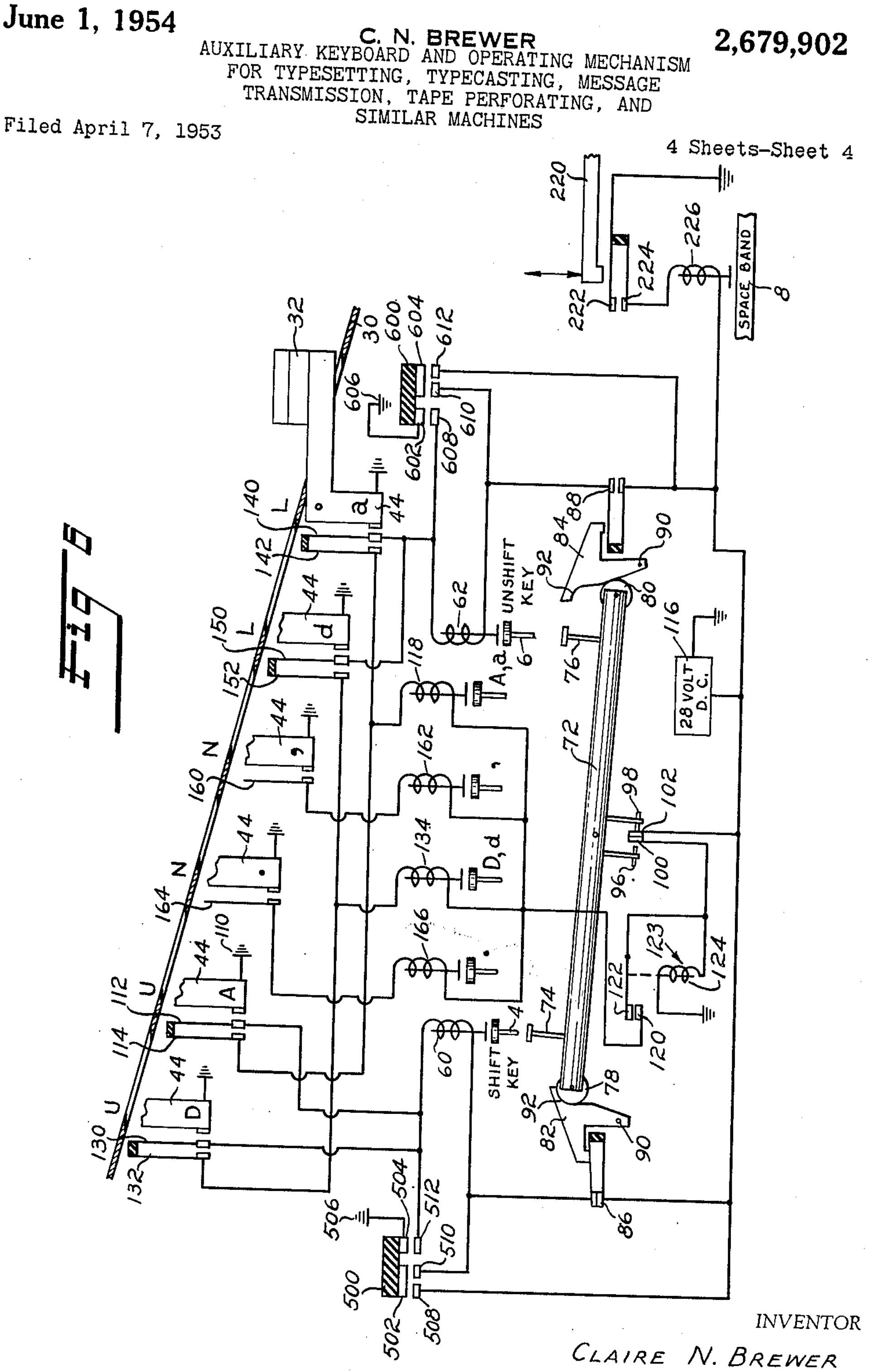
Figure 6 is a circuit diagram of a preferred embodiment of the invention.

The preferred means of operating the keyboard of the tape-perforating machine through the medium of the superimposed keyboard of this invention are disclosed in Fig. 6, in which there is disclosed a section of the keyboard base 30, beneath which are shown the depending lower arms 44 of six of the keys 32, only one of which keys is fully shown in Fig. 6. Two of these arms, which are marked with the letters A and D, form part of the "A" and "D" keys of the keyboard of this invention and are both upper case letters, being so designated by the letter U. Two of the arms 44 are respectively marked by a comma and a period and form part of the "comma" and the "period" keys of the superimposed keyboard. The "comma" and "period" keys of the keyboard of the tape-perforating machine, when operated, will produce tape perforations which will cause the typesetting machine to set and cast a comma or period regardless of whether the shift or unshift key has been previously operated. These keys of the superimposed keyboard are therefore referred to as no-shift keys and accordingly are designated by the letter N. The two remaining arms 44 shown in Fig. 6 form part of the lower case "a" and "d" keys of the superimposed keyboard and are, respectively, marked with these letters and by the letter L to denote that they are lower case letter keys.

The arms 44 marked A and D in Fig. 6 and designated by the letter U, represent the arms 44 of all of the upper case character keys of the keyboard of this invention and which are operated when it is desired to cast and set an upper case character through the medium of the tape-perforating machine. The arms 44 marked with a comma and a period and designated by the letter N, are representative of all of the arms 44 of all of the keys of the keyboard of this invention which bear a character corresponding to one of the keys of the tape-perforating machine keyboard which, when operated, produce a tape perforation causing the same character to be set and cast regardless of whether the shift or unshift key has been previously operated. The arms 44 marked with the lower case letters a and d, and designated by the letter L, are representative of all the arms 44 of all the keys of the keyboard of this invention which are operated when it is desired to cast and set a lower case character through the medium of the tape-perforating machine. All of the U, N and L keys of the superimposed keyboard are operative in the same manner and through the same circuits as will be now described with reference to the representative keys which are actually illustrated in Fig. 6 of the drawings.

Referring first to the "A" key of the superimposed keyboard 30 the arm 44 of which is shown in Fig. 6, it will be seen that this arm is grounded to the machine frame at 110, as are all of the arms 44. Two spaced, insulated, flexible contact members 112, 114 are supported adjacent to the A arm 44 in the direction in which the arm will move when the key is depressed, whereby the arm, in so moving, will first engage contact member 112 and then move the same into engagement with the contact member 114. Contact member 112 is electrically connected to one terminal of the winding of solenoid 60 which is positioned above and operates the shift key 4 of the tape-perforating machine, the other terminal of such winding being connected through micro-switch 86 to a source of direct current 116. The second contact 114 is electrically connected to the winding of solenoid 118 which is positioned above and the plunger of which is operative to depress the "A, a" key of the tape-perforating machine, the other terminal of the winding being connected to a contact member 120 which is adjacent but normally spaced from a second contact member 122 which is connected to contact member 100. The contact members 120, 122 form part of and are operated into and out of engagement with each other by a time delay relay 123 having winding 124, one terminal of the winding being grounded and the other terminal being connected to contact member 100.

Each upper case letter key of the superimposed keyboard has associated with it two contact members corresponding in position and function to the contact members 112, 114 which are associated with the "A" letter key, the first of such contact members being connected in every case to the winding of shift key solenoid 60 and the second being connected to the winding of the solenoid which is positioned above and operates the corresponding letter key of the tape-perforating machine. Thus, two spaced, flexible, insulated contact members 130, 132 are positioned in the path of movement of arm 44 of the upper case "D" key and are engaged in the same manner as described above in connection with the "A" key. Contact member 130 is connected to one terminal of the winding of shift key operating solenoid 60 and the second contact member 132 is connected to one terminal of the winding of the solenoid 134 which is positioned above and operates the "D, d" letter key of the tape-perforating machine, the other terminal being connected to the contact member 120.

Referring now to the lower case letter key "a" of the superimposed keyboard of this invention, it will be seen that the arm 44 of this key has associated with it two spaced, flexible, insulated contact members 140, 142 which are arranged in the path of movement of the arm to be successively engaged as the "a" key is depressed. The contact 140, which is nearest the arm 44 of the "a" key, is connected to the winding of the solenoid 62 which is positioned above and operates the unshift key 6 of the tape perforating machine, the other terminal of the winding being connected through micro-switch 88 to the source of power 116. The second contact 142 is connected to the winding of the solenoid 118 which is positioned above and operates the "A, a"

key of the tape-perforating machine, the other terminal of the winding being connected to contact member 120 which has been described before.

Each lower case letter key of the keyboard of this invention has associated with it two contact members corresponding in position and function to the contact members 140, 142 which are associated with the lower case "a" letter key of such keyboard, the first being connected in every case to the winding of the unshift key solenoid 62 and the second being connected to the winding of the solenoid which operates the corresponding letter key of the tape-perforating machine. Thus, two spaced, flexible insulated contact members 150, 152 are positioned in the path of movement of arm 44 of the lower case "d" key and are engaged in the same manner as the contact members 140, 142 are engaged by the arm 44 of the "a" key. Contact member 150 is connected to one terminal of the winding of the unshift key operating solenoid 62 and the second contact member 152 is connected to one terminal of the winding of the solenoid 134 which is positioned above and operates the "D, d" key of the tape-perforating machine, the other terminal of the winding being connected to the contact member 120.

Referring now to the "comma" key of the keyboard 30, it will be seen that the arm 44 of this key has associated with it a single contact member 160 which is normally spaced from the arm 44 and is positioned to be engaged by it upon operation of the key of which arm 44 forms a part. Contact 160 is connected to the winding of solenoid 162 which is positioned above and the plunger of which operates the "comma" key of the tape-perforating machine, the other terminal of the winding being connected to contact member 120.

Each no-shift key of the keyboard 30 of this invention has associated with it one contact member corresponding in position and function to the contact member 160 which is associated with the "comma" key, and each such contact member is connected directly to the solenoid which is positioned above and the plunger of which operates the corresponding key of the tape-perforating machine. Thus, a contact member 164 is associated with the arm 44 of the "period" key of the keyboard 30 of this invention and is normally spaced from it but is positioned to be engaged by the arm on operation of the "period" key. This contact member 164 is connected to the winding of solenoid 166 which is positioned above and the plunger of which operates the "period" key of the tape-perforating machine, the other terminal of the winding being connected to contact 120.

The operation of the described apparatus and circuits is as follows, it being assumed that the unshift key was the last of the shift and unshift keys to be depressed, in which case the micro-switch 86 is closed and the micro-switch 88 is open. Upon depression of the "A" key of the keyboard 30, the arm 44 of this key will first engage contact 112, completing a circuit from the grounded arm 44, contact 112, solenoid winding 60, micro-switch 86 to the source of power 116, thus energizing solenoid 60 and depressing the shift key 4. Depression of the shift key will move rod 72 in a counter-clockwise direction, moving cam 82 in a clockwise direction about its pivotal support to open micro-switch 86 and de-energize the solenoid 60, thus permitting the shift key 4 to return to its upper position. It will be remembered, however, that after operation of the shift key, all tape perforations will cause setting and casting of upper case characters until operation of the unshift key. When the rod 72 is moved in a counter-clockwise direction by the depression of the shift key, the abutment member 98 at the center of the rod 72 will first move away from contact member 102, causing contact members 100, 102 to separate. These contact members will not engage each other until the rod 72 approaches the limit of its movement in a counter-clockwise direction, at which time abutment 96 pushes contact member 100 into engagement with contact member 102. The contact members 100, 102 control the connection of relay winding 124 and contact member 122 to the source of power and these are connected to the source when either end of the rod 72 is in or adjacent its depressed condition and are not connected to the source during most of the travel of the rod 72 in moving from one tilted position to the other. Consequently, as the rod 72 is moved in a counter-clockwise direction by depression of the shift key 4, the contact members 100, 102 will first move apart to disconnect time delay relay winding 124 and contact member 122 from the source of power, thus causing contact members 120, 122 to separate, and will then be moved back into engagement with each other to again connect the relay winding 124 and contact member 122 to the source of power, thus connecting contact members 120 and 122 after a delay due to the inherent operation of the time delay relay 123. This opening of the contact members 120, 122 prevents connection of the solenoid 118 of the "A" key to the source of power for a small interval of time which is necessary to permit operation of the shift key before operation of the letter key. The arm 44 of the "A" key has already moved contact 112 into engagement with contact 114, and when contacts 120, 122 are re-closed upon engagement of contact members 100, 102 after the delay due to the operation of the time delay relay, a circuit will be established between grounded arm 44, contacts 112 and 114, the winding of solenoid 118 of the "A" key of the tape-perforating machine, contacts 120, 122, contact members 100, 102 and the source of power 116, thus energizing the solenoid 118 to depress the "A" key and produce a tape perforation corresponding to the upper case letter "A."

The operation of any upper case letter key of the keyboard 30 will cause the same sequence of operations and circuits as described in connection with the "A" letter key. However, each of the second contact members of the pairs of contact members associated with the arm 44 of each upper case letter key of the keyboard 30 is connected to the winding of the solenoid which is positioned above and which operates the corresponding letter key of the tape-perforating machine. Thus, for example, the second contact 132 which is associated with the arm 44 of the upper case letter "D" key of the keyboard 30 is connected to the solenoid 134 which is positioned above and operates the "D" key of the tape-perforating machine.

If it is desired to produce a tape perforation corresponding to a lower case letter or character, the appropriate key of the keyboard 30 is operated. If, for example, the lower case "a" key is depressed, the arm 44 of that key moves first into engagement with contact 140, thus completing a circuit from the grounded arm 44, contact 140, the winding of unshift key solenoid 62, and micro-switch 68 to the source of power 116, thus energizing the solenoid 62 to depress the unshift key 6 and move the rod 72 in a clockwise direction about its pivotal support. This causes the cam 84 to be moved to open the micro-switch 68 to de-energize the solenoid 62 and cause the unshift key to return to its upper position. At the same time, the contact members 100, 102 and 120, 122 go through the opening-closing cycle described above, at the completion of which, arm 44 of the "a" key having already moved contact 140 into engagement with contact 142, a circuit is completed from the grounded arm 44, contacts 140 and 142, the winding of solenoid 118 which is positioned above and operates the "A" key of the tape-perforating machine, to the source of power 116 through contacts 120, 122 and 100, 102.

It will be seen that in the operation of any upper case or lower case character key of the keyboard of this invention the following sequence of operations take place:

1. Arm 44 of the operated key engages the first contact member associated with it, energizing the shift or unshift key solenoid.

2. The shift or unshift key moves downwardly, moving rod 72 about its pivot.

3. The circuit through the operated shift or unshift key solenoid is opened at the associated micro-switch, causing the shift or unshift key to be returned to raised position.

4. Contact members 120, 122 go through an opening-closing cycle providing, with the delay due to the operation of the time delay relay, a time delay between operation of the shift or unshift key and operation of the letter key.

5. The second contact is engaged by the arm 44 of the operated key of keyboard 30.

6. The solenoid of the character key of the tape-perforating machine is energized to produce a tape perforation.

7. Release of the operated key of keyboard 30 deenergizes all circuits.

In the operation of any no-shift key of the tape-perforating machine keyboard, such as the "coma" key or the "period" key, operation of the corresponding key of the keyboard provided by this invention completes a circuit through the winding of the solenoid which is positioned above and operates the key of the tape-perforating machine, thus operating the solenoid and depressing the key. The circuit of the solenoids of these no-shift keys includes the pair of contact members 120, 122 and the pair 100, 102. However, as the contact members 100, 102 are in engagement in any tilted position of the rod 72, which is its only position when at rest, the contacts 120, 122 will normally be closed by reason of energization of relay 123 through contacts 100, 102 and the circuit through the key-operating solenoid, for example solenoid 162, will be completed as soon as the arm 44 of any no-shift key engages the associated contact member.

In the circuit and apparatus disclosed in Fig. 6, operation of any of the upper case or lower case letter keys of the keyboard 30 causes the arm 44 of the operated key to physically engage two contact members in succession, first causing operation of the shift or unshift key solenoid and then causing operation of the corresponding letter key solenoid, while operation of any of the no-shift keys of the keyboard 30 causes immediate energization of the solenoid which operates the corresponding key of the tape-perforating machine. In a modified form of the invention, a relay mechanism is associated with each key of the keyboard 30, which is energized upon depression of any of the keys of that keyboard and which, when so energized, causes the two contacts to be successively connected in the shift or unshift key solenoid circuit and in the letter key solenoid circuit.

Figures 7, 8, 9:
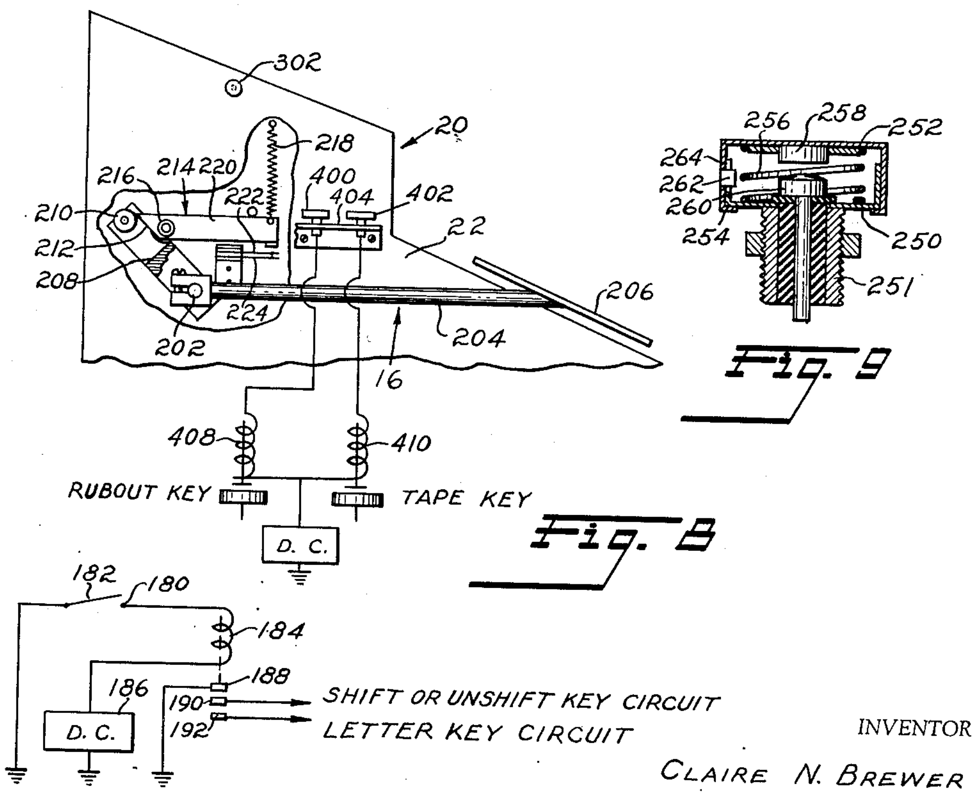
Figure 7 is a circuit diagram showing a modification of a part of the invention.
Figure 8 is a side view of the space band lever operating mechanism, showing also the rubout and tape key operating mechanisms
Figure 9 is a cross-sectional view of a switch key provided by the invention and which is particularly useful in a circuit such as is disclosed in Fig. 7.

This relay arrangement is disclosed in Fig. 7 and comprises a switch 180, one contact member 182 of which is grounded while the other is connected through the winding of a relay 184 to a source of direct current 186. The relay plunger is connected to a movable grounded contact member 188 which, on energization of the relay winding, is moved into successive engagement with a first contact member 190 which is connected to the shift or unshift key circuit and a second contact member 192 which is connected to the letter key circuit. The contact members 190, 192 correspond to the two contact members associated with the arm 44 of each upper or lower case letter key of the keyboard 30, for example the contact members 112, 114, or 140, 142 which are respectively associated with the "A" and "a" letter key arms 44, as shown in Fig. 6.

In Linotype machine operation, the movement of the space band lever which is associated with the keyboard has a certain "feel" which is well known to skilled operators of such machines and, as a part of my invention, I have provided a spaceband-lever operating means which will convey this same "feel" to the operator. This feature of my invention is disclosed in Fig. 8 while the electrical circuit for operating the space band bar, and which is energized by these means, is disclosed in Fig. 6.

Referring to Fig. 8, it will be seen that I have provided a space band lever 16 which is pivoted at 202 at the left side of the frame 20 outside of the side wall 22. One arm 204 of this lever extends forwardly of the frame and at its end is provided with a plate 206 which is positioned just to the left of the keyboard base plate 30 where it may easily be engaged by the finger of the operator. The other arm 208 of this lever extends upwardly at an obtuse angle to arm 204 from the pivot 202 and has at its upper end a roller 210, the periphery of which engages the downwardly inclined face 212 of the shorter arm of a second lever 214 which is pivoted to the frame at 216. An extension spring 218 is connected between the frame and the end of the longer arm 220 of lever 214 and constantly urges the inclined face 212 into engagement with the periphery of the roller 210. Two spaced, insulated contact members 222, 224 are mounted below the end of the longer lever arm 220 and are adapted to be moved into electrical contact with each other upon downward movement of arm 220. As shown in Fig. 6, the upper contact member 222 is grounded and the lower contact member 224 is connected through the winding 226 of a solenoid to the source of power 116. The plunger of this solenoid is positioned above the spaceband bar 8 and upon energization of the solenoid will be moved downwardly to depress the spaceband bar. In the operation of this device, depression of the finger plate 206 will cause the roller 210 to ride against the inclined face 212, moving lever arm 220 downwardly against the force of spring 218. This will cause engagement of contact members 222, 224, thereby completing the circuit through the solenoid winding 226, causing the spaceband bar 8 to be depressed by the plunger of the solenoid. The circuit through the solenoid winding will be broken by release of the finger plate 206 which will permit spring 218 to raise lever arm 220 out of engagement with contact members 222, 224, to permit these members to move out of electrical engagement with each other. The plunger of the solenoid will be raised into inoperative position by the usual spring means (see Fig. 4 while the spaceband bar will be raised to its normal position by the usual spring means which are associated with it. If desired, the plunger of solenoid 226 may be attached to the lever which is operated by the spaceband bar 8 instead of being positioned above the spaceband bar itself and, in such case, the operation of the spacing mechanism will be exactly as described above.

In Fig. 9 of the drawings, there is disclosed a switch key which is provided by my invention and which is particularly useful in connection with the circuit disclosed in Fig. 7. This switch key comprises a lower member 250 of U-shaped cross-section, which is attached to the upper end of a supporting member 251, and an upper member 252 of inverted U-shaped cross-section having inturned flanges 254 at the lower extremities of its side arms which underlie the bottom of the lower U-shaped member 250. A compression spring 256 is positioned between these two U-shaped members and constantly urges the member 252 upwardly. Contact members 258, 260 are mounted on the inner surfaces of the bottoms of the two U-shaped members and are normally spaced apart, but are brought into engagement with each other upon depression of the upper member 252 against the force of spring 256. One side wall of the upper U-shaped member is provided with an inwardly-extending lug 262 which is received within a vertically-extending slot 264 in the adjacent side wall of the lower U-shaped member, providing a guide for the two relatively movable members and a means for holding them from relative lateral movement. The connection of the parts of this switch in the operating circuit is disclosed in Fig. 7, and it will be seen that the contact members 258, 260 of Fig. 9 correspond to the switch members 180, 182 of Fig. 7.

Tape-perforating machines of the type to which the invention relates include a so-called "repeat key" which, when depressed, causes the tape perforating mechanism to repeat the tape perforation produced by any depressed key until release of the key and, in accordance with my invention, I provide means for operating this repeat key, which means are positioned to the left of the keyboard 30, as shown in Figs. 2 and 3. These means comprise a flexible cable 300 terminating at one end in a push button 302 extending horizontally through side wall 22 of the frame 20 just above the space band operating lever 206 and at its other end being positioned above and adjacent the upper surface of the repeat key 306. It will be apparent that by depressing the push button 302 the repeat key of the tape-perforating machine will be operated and may be held in operated position so long as the push button 302 is depressed.

In addition to the repeat key, tape perforating machines of the types to which this invention relates include also "rubout" mechanism which, when operated, produces tape perforations which do not represent any character or letter and which may accordingly be used to eliminate any erroneous or undesired tape perforations. These machines also include mechanism for producing small perforations at and along the center-line of the tape. Means are provided by this invention for operating the rubout mechanism and the center-perforating means (the "tape" key) of the tape-perforating machine. These means comprise grounded rubout key 400 and grounded tape key 402 which are separately mounted on a bracket 404 which is secured to the side wall 22 and spaced therefrom by spacers 406, and which keys are preferably the same in construction and operation as that disclosed in Fig. 9. These two keys are positioned forwardly of and below the repeat key operating button 302 and above and rearwardly of the space bar 206, whereby they may be operated by the left hand of the operator in conjunction with the operation of the repeat key button 302 and the space bar 206. Depression of the rubout key closes a circuit which actuates a solenoid 408 the plunger of which is positioned to operate the rubout key of the tape perforating machine. The rubout key 400 may be operated each time a rubout perforation is required or it can be held down while the operator simultaneously pushes the repeat button 302 in which case the rubout perforation will be repeated on the tape until either the repeat button or the rubout key is released. The depression of the tape key 402 closes an electrical circuit, energizing a solenoid 410 the plunger of which is positioned to operate the "tape key" of the tape-perforating machine, thus energizing the mechanism of the tape-perforating machine which produces the center-line tape perforation.

It will be understood that additional contact keys for actuating solenoids producing specific tape perforations which control the operations of the typecasting machines may be provided in addition to the tape and rubout keys which are illustrated in the drawings and described herein and, if desired, may be mounted on bracket 404 by extending this bracket.

In the use and operation of a machine which perforates tape which is subsequently used in the operation and control of a typesetting machine, it is often desirable or necessary to produce a "shift" or "unshift" tape perforation without producing a subsequent perforation corresponding to a character key. Means are provided by my invention for producing such an independent shift or unshift perforation and such means are disclosed in Fig. 6. The means for producing such an independent shift perforation comprises a key 500 which is preferably constructed and operable in the same manner as the key disclosed in Fig. 9 and which has two upper contacts 502, 504, the latter of which is grounded at 506, and three lower contacts 508, 510, 512, the first two of which are engaged, when the key is operated, by upper contact 502 and the latter of which is engaged by upper contact 504. Lower contact 512 is connected to that terminal of the winding of shift key solenoid 60 which is connected to the first contact 130 (or 112) which is positioned adjacent each upper case character key 32 of the keyboard of my invention, while the lower contact 510 is connected to the other terminal of such winding. The third lower contact member 508 is connected to the source of electric energy 116, and it will be seen that the contacts 508, 510 bridge the switch 86 which is operated by cam 82 on movement of the rod 72. An exactly similar arrangement is provided in connection with the unshift key 6 and comprises the key 600 having upper contacts 602, 604, the first of which is grounded at 606, and lower contacts 608, 610, 612.

Lower contact 608 is adapted to be engaged only by upper contact 602 and is connected to that terminal of unshift key solenoid 62 which is connected to the first contact 140 (or 150) which is positioned adjacent each lower case character key 32 of the keyboard 30. Lower contact members 610, 612 are adapted to be engaged only by upper contact 604 and are respectively connected to the second terminal of the unshift key solenoid 62 and to the source 116, thus bridging the switch 80 which is operated by cam 84.

In the positions of the parts as shown in Fig. 6 it will be seen that, the unshift key having been operated, any depression of a character key will produce a lower-case tape perforation. If it should be desired to produce an upper case tape perforation without producing any character perforation, this may be done by operating the key 500 to cause upper contact 502 to engage lower contacts 508, 510 and upper contact 504 to engage lower contact 512, thus establishing a circuit from ground at 506 to upper contact 504, lower contact 512, the winding of shift key solenoid 60, lower contact 510, upper contact 502, lower contact 508 and the source 116, thus energizing the shift key solenoid 60 and operating the shift key 4. The unshift key may be operated without operating any character key by depressing the key 600, which will energize the unshift key solenoid winding 62 through the circuit described above in connection with the key 600. The keys 500, 600 are preferably mounted on the bracket 404 which is described hereinbefore and on which the rubout and tape keys are mounted.

While I have described and illustrated certain embodiments of my invention it will be apparent to those skilled in the art that other embodiments, as well as modifications of these disclosed, may be made and practiced without departing from the spirit and scope of the invention, for the limits of which reference must be had to the appended claims.

What is claimed is:

1. In combination with a machine having a keyboard having character keys, each representing both the upper case and lower case of the character, a shift key for producing upper case on subsequent operation of a character key, and an unshift key for producing lower case on subsequent operation of a character key, an auxiliary keyboard having separate upper case and lower case keys for each character, means operable upon operation of any upper case key of the auxiliary keyboard after operation of any lower case key of the auxiliary keyboard to first operate the shift key and then the corresponding character key of said machine, and means operable upon operation of any lower case key of the auxiliary keyboard after operation of any upper case key of the auxiliary keyboard to first operate the unshift key and then the corresponding character key of said machine.

2. In combination with a machine having a keyboard having a first group of character keys each representing both the upper case and lower case of the character, a second group of character keys each representing a character which is the same in both upper and lower case, and a shift key and an unshift key for producing upper case or lower case, respectively, on subsequent operation of a character key of the first group, an auxiliary keyboard having a key for the upper case and a key for the lower case of each character of the first group of keys of said machine and a separate key for each character of the second group of keys of said machine, means operable upon operation of any upper case character key of the auxiliary keyboard after operation of any lower case key of the auxiliary keyboard to first operate and release the shift key and then operate the corresponding character key of said machine, means operable upon operation of any lower case key of the auxiliary keyboard after operation of any upper case key of the auxiliary keyboard to first operate and release the unshift key and then operate the corresponding character key of said machine, and means operable upon operation of any key of the auxiliary keyboard corresponding to a character key of the second group of keys of said machine for operating the corresponding key of said second group.

3. An auxiliary keyboard for operating the keys for the keyboard of a tape-perforating machine having a plurality of character keys each producing the same characteristic tape perforation for upper case and lower case, a shift key for producing a characteristic upper case tape perforation and an unshift key for producing a characteristic lower case tape perforation, the auxiliary keyboard comprising a plurality of keys each marked with an upper case or lower case character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper and lower case keys of the auxiliary keyboard and being positioned to be successively engaged by the associated key on depression thereof, an electric circuit including the first contact member of each pair associated with an upper case key of the auxiliary keyboard and also including the winding of the shift key solenoid, an electric circuit including the second contact member of each pair associated with an upper case key of the auxiliary keyboard and also including the winding of the solenoid associated with the corresponding character key of the tape-perforating machine keyboard, an electric circuit including the first contact of each pair associated with a lower case key of the auxiliary keyboard and also including the winding of the unshift key solenoid, an electric circuit including the second contact of each pair associated with a lower case key of the auxiliary keyboard and also including the winding of the solenoid associated with the corresponding character key of the tape-perforating machine keyboard, means operable upon depression of either the shift or unshift key of the tape-perforating machine to open the circuit of the solenoid associated with the depressed key and to maintain said circuit open until depression of the other of the shift and unshift keys, means operable upon depression of the other of the shift and unshift keys to operate said means to close said opened circuit of the previously depressed shift or unshift key to permit completion of said circuit upon subsequent operation of a key of the auxiliary keyboard, and a source of power for said electric circuits.

4. An auxiliary keyboard for a tape-perforating machine having a plurality of character keys, each producing the same characteristic tape-perforation for upper case and lower case, a shift key for producing a characteristic upper case tape perforation and an unshift key for producing a characteristic lower case tape perforation, the auxiliary keyboard comprising a plurality of keys each marked with an upper case, lower case or no-shift character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper and lower case keys of the auxiliary keyboard and being positioned to be successively engaged by the associated key on depression thereof, a single contact member associated with each of the no-shift keys of the auxiliary keyboard and being positioned to be engaged by the associated key on depression thereof, an electric circuit including the first contact member of each pair associated with an upper case key of the auxiliary keyboard and also including the winding of the shift key solenoid, an electric circuit including the second contact member of each pair associated with an upper case key of the auxiliary keyboard and also including the winding of the solenoid associated with the corresponding character key of the tape-perforating machine keyboard, an electric circuit including the first contact of each pair associated with a lower case key of the auxiliary keyboard and also including the winding of the unshift key solenoid, an electric circuit including the second contact of each pair associated with a lower case key of the auxiliary keyboard and also including the winding of the solenoid associated with the corresponding character key of the tape-perforating machine keyboard, means operable upon depression of either the shift or unshift key of the tape-perforating machine to open the circuit of the solenoid associated with the depressed key and to maintain said circuit open until depression of the other of the shift and unshift keys, means operable upon depression of the other of the shift and unshift keys to operate said means to close said opened circuit of the previously depressed shift or unshift key to permit completion of said circuit upon subsequent operation of a key of the auxiliary keyboard, electric circuits each including the single contact associated with each of the no-shift keys of the auxiliary keyboard and the winding of the solenoid associated with the corresponding character key of the tape-perforating machine keyboard, and a source of power for said electric circuits.

5. An auxiliary keyboard for a tape-perforating machine having a plurality of character keys each producing the same characteristic perforation for upper case and lower case, a shift key for producing a characteristic upper case tape perforation and an unshift key for producing a characteristic lower case tape perforation, the auxiliary keyboard comprising a plurality of keys each marked with an upper case or lower case character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair associated with an upper case key of the auxiliary keyboard and also including the winding of the shift key solenoid, an electric circuit including the second contact member of each pair associated with an upper case key of the auxiliary keyboard and also including the winding of the solenoid associated with the corresponding character key of the tape-perforating machine keyboard, an electric circuit including the first contact of each pair associated with a lower case key of the auxiliary keyboard and also including the winding of the unshift key solenoid, an electric circuit including the second contact of each pair associated with a lower case key of the auxiliary keyboard and also including the winding of the solenoid associated with the corresponding character key of the tape-perforating machine keyboard, means operable upon depression of either the shift or unshift key of the tape-perforating machine to de-energize the solenoid associated with the depressed key to permit return of the depressed shift or unshift key to normal position, means to maintain the circuit of the solenoid associated with the depressed shift or unshift key in open condition until depression of the other of the shift and unshift keys, and a source of power for said electric circuits.

6. An auxiliary keyboard for a tape-perforating machine having a keyboard having a plurality of character keys each producing the same characteristic perforation for upper case and lower case, a shift key for producing a characteristic upper case tape perforation and an unshift key for producing a characteristic lower case tape perforation, the auxiliary keyboard comprising a plurality of keys each marked with an upper case or lower case character, a plurality of solenoids each having a plunger and each being arranged and positioned to be operatively associated with one of the character, shift and unshift keys of the tape perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair of contact members associated with an upper case key of the auxiliary keyboard and also including the winding of the shift key solenoid, an electric circuit including the second contact member of each pair associated with an upper case key of the auxiliary keyboard and also including the winding of the solenoid associated with the corresponding character key of the tape-perforating machine keyboard, an electric circuit including the first contact member of each pair associated with a lower case key of the auxiliary keyboard and also including the winding of the unshift key solenoid, an electric circuit including the second contact of each pair associated with a lower case key of the auxiliary keyboard and also including the winding of the solenoid associated with the corresponding character key of the tape perforating machine keyboard, means operable upon depression of either the shift or unshift key of the tape-perforating machine to open the circuit of the solenoid associated with the depressed key and to maintain said circuit open until depression of the other of the shift and unshift keys, means operable upon depression of the other of the shift and unshift keys to operate said means to close said opened circuit of the previously depressed shift or unshift key to permit completion of said circuit upon subsequent operation of a key of the auxiliary keyboard, a source of power for said electric circuits, switch means, included in the circuit of the operating solenoid of each character key of the tape-perforating machine means operable upon depression of either the shift key or the unshift key of the tape-perforating machine to first open and then close said switch, and means to provide a time delay between the depression of the shift or unshift key and the depression of the character key.

7. An auxiliary keyboard for a tape-perforating machine having a keyboard having a plurality of character keys each producing a characteristic tape perforation for both upper and lower case, a shift key for producing a characteristic upper case tape perforation and an unshift key for producing a characteristic lower case tape perforation, the auxiliary keyboard comprising a plurality of keys each marked with an upper case or lower case character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair of contact members associated with an upper case key of the auxiliary keyboard and also including the winding of the shift key solenoid, an electric circuit including the second contact member of each pair of contact members associated with an upper case key of the auxiliary keyboard and also including the winding of the solenoid associated with the corresponding character key of the tape-perforating machine keyboard, an electric circuit including the first contact member of each pair associated with a lower case key of the auxiliary keyboard and also including the winding of the unshift key solenoid, an electric circuit including the second contact member of each pair associated with a lower case key of the auxiliary keyboard and also including the winding of the solenoid associated with the corresponding character key of the tape-perforating machine keyboard, means operable upon depression of either the shift or unshift key of the tape-perforating machine to open the circuit of the solenoid associated with the depressed key and to maintain said circuit open until depression of the other of the shift and unshift keys, means operable upon depression of the other of the shift and unshift keys to operate said means to close said opened circuit of the previously depressed shift or unshift key to permit completion of said circuit upon subsequent operation of a key of the auxiliary keyboard, a source of power for said electric circuits, solenoid-controlled switch means in the circuit of the operating solenoid of each of the character keys of the tape-perforating machine, a normally-closed circuit including the source of power and the operating solenoid of said switch means for normally maintaining said switch in closed position, means operable by depression of either the shift key or the unshift key to first open and then close said normally closed circuit, and means for delaying the depression of the character key after depression of the shift or unshift key.

8. An auxiliary keyboard for a tape-perforating machine having a keyboard having a plurality of character keys each producing a characteristic perforation for upper case and lower case, a shift key for producing a characteristic upper case tape perforation and an unshift key for producing a characteristic lower case tape perforation, the auxiliary keyboard comprising a plurality of keys each marked with an upper case or lower case character, a plurality of solenoids each having a plunger operatively associated with one of the character, shift and unshift keys of the tape-perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair associated with an upper case key of the auxiliary keyboard and also including the winding of the shift key solenoid, an electric circuit including the second contact member of each pair associated with an upper case key of the auxiliary keyboard and also including the winding of the solenoid associated with the corresponding character key of the tape-perforating machine keyboard, an electric circuit including the first contact of each pair associated with a lower case key of the auxiliary keyboard and also including the winding of the unshift key solenoid, an electric circuit including the second contact of each pair associated with a lower case key of the auxiliary keyboard and also including the winding of the solenoid associated with the corresponding character key of the tape-perforating machine keyboard, means operable upon depression of either the shift or unshift key of the tape-perforating machine to open the circuit of the solenoid associated with the depressed key and to maintain said circuit open until depression of the other of the shift and unshift keys, means operable upon depression of the other of the shift and unshift keys to operate said means to close said opened circuit of the previously depressed shift or unshift key to permit completion of said circuit upon subsequent operation of a key of the auxiliary keyboard, a source of power for said electric circuits, solenoid-controlled switch means in the circuit of the operating solenoid of each of the character keys of the tape-perforating machine, a normally-closed circuit including the source of power and the operating solenoid of said switch means for normally maintaining said switch in closed position, a rod pivotally mounted at its center, means for moving said rod in a clockwise or counter-clockwise direction about its pivot to a tilted position by depression of the shift or unshift key, abutments mounted on said rod adjacent and on opposite sides of its pivotal support, two contact members mounted between said abutments and so positioned with respect to each other and to the abutments that they are forced into contact with each other by one or the other of the abutments in each fully tilted position of the rod and are separated in and adjacent the horizontal position of the rod and being included in said normally-closed circuit to first open and then close said normally-closed circuit on depression of the shift key or the unshift key, and means in said circuit to provide a time delay between the operation of the shift or unshift key and the operation of the character key.

9. In combination with a machine for perforating tape with characteristic perforations which are used to control the operation of a typesetting machine, said tape-perforating machine having a plurality of character keys each producing a characteristic tape perforation when operated, a shift key for producing a characteristic tape perforation which causes subsequent character perforations to set upper case characters in the operation of the typesetting machine and an unshift key for producing a characteristic tape perforation which causes subsequent character perforations to set lower case characters in the operation of the typesetting machine, an auxiliary keyboard for operating the character, shift and unshift keys of said tape-perforating machine and having keys substantially corresponding in position to those of a Linotype keyboard and comprising a first group of keys which in Linotype operation print only upper case characters and a second group of keys which in Linotype operation print only lower case characters, means operable upon depression of a key of the first group of keys of the auxiliary keyboard after operation of any key of the second group of keys of the auxiliary keyboard first to depress and then release the shift key of the tape-perforating machine and then to depress and release the key of the tape-perforating machine which corresponds to the depressed key of the auxiliary keyboard, and means operable upon depression of a key of the second group of keys of the auxiliary keyboard after operation of any key of the first group of keys of the auxiliary keyboard first to depress and then release the unshift key of the tape-perforating machine and then to depress and release the key of the tape-perforating machine which corresponds to the depressed key of the auxiliary keyboard.

10. In combination with a tape-perforating machine having a keyboard having a shift key, an unshift key, and a plurality of character keys which produce characteristic tape perforations, an auxiliary keyboard comprising keys substantially corresponding in position to those of a Linotype keyboard and comprising a first group of keys which in Linotype operation print only upper case characters and a second group of keys which in Linotype operation print only lower case characters, key-operating means associated with each of the shift, unshift and character keys of the tape-perforating machine for depressing the key, means operable upon depression of a key of the first group of keys of the auxiliary keyboard after operation of any key of the second group of keys of the auxiliary keyboard first to operate the key-operating means associated with said shift key and then to operate the key-operating means associated with the character key of the tape-perforating machine corresponding to the depressed key of the auxiliary keyboard, and means operable upon depression of a key of the second group of keys of the auxiliary keyboard after operation of any key of the first group of keys of the auxiliary keyboard first to operate the key-operating means associated with said unshift key and then to operate the key-operating means associated with the character key of the tape-perforating machine corresponding to the depressed key of the auxiliary keyboard.

11. In combination with a tape-perforating machine having a keyboard having a shift key, an unshift key, and a plurality of keys which produce characteristic tape perforations, an auxiliary keyboard comprising keys substantially corresponding in position to those of a Linotype keyboard and comprising a group of keys which in Linotype operation print only upper case characters, a second group of keys which in Linotype operation print only lower case characters, and a third group of keys, key-operating means associated with each of the shift, unshift and character keys of the tape-perforating machine for depressing the key, means operable upon depression of a key of the first group of keys of the auxiliary keyboard after operation of any key of the second group of keys of the auxiliary keyboard for first operating the key-operating means associated with the shift key and then operating the key-operating means associated with the character key of the tape-perforating machine corresponding to the depressed key of the auxiliary keyboard, means operable upon depression of a key of the second group of keys of the auxiliary keyboard after operation of any key of the first group of keys of the auxiliary keyboard for first operating the key-operating means associated with the unshift key and then operating the key-operating means associated with the character key of the tape-perforating machine corresponding to the depressed key of the auxiliary keyboard, and means operable upon depression of a key of the third group of keys of the auxiliary keyboard for operating the key-operating means associated with the character key of the tape-perforating machine corresponding to the depressed key of the auxiliary keyboard.

12. The combination according to claim 11, in which each key-operating means comprises a solenoid having a vertically movable plunger positioned above the associated key for depressing the key upon energization of the solenoid winding, and spring means normally holding the plunger out of engagement with the associated key.

13. The combination according to claim 11, comprising in addition means operable upon operation of the key-operating means associated with either the shift or the unshift key for delaying the operation of the key-operating means associated with the character key.

14. In combination with a tape-perforating machine having a keyboard having a plurality of character keys each producing a characteristic perforation for both upper and lower case, a shift key for producing a characteristic upper case tape perforation and an unshift key for producing a characteristic lower case tape perforation, a solenoid associated with each character key to operate the same, an electric circuit including each of said solenoids, a solenoid associated with the shift key to operate the same, a solenoid associated with the unshift key to operate the same, means for energizing the shift key solenoid, means for energizing the unshift key solenoid, means operable by operation of the shift key or the unshift key to de-energize the operating solenoid of the operated shift or unshift key, means operable by operation of the shift or unshift key to first open and then close the circuit of the solenoid of a character key to operate the character key, and means to provide a time delay between the operation of the shift or unshift key and the operation of the character key.

15. The invention according to claim 1 comprising in addition, means for operating the shift key without subsequent operation of a character key, and means for operating the unshift key without subsequent operation of a character key.

16. In combination with a machine having a keyboard having character keys each representing both the upper case and lower case of the character, a shift key for producing upper case on subsequent operation of a character key, and an unshift key for producing lower case on subsequent operation of a character key, an auxiliary keyboard having separate upper case and lower case keys for each character, means operable upon operation of any upper case key of the auxiliary keyboard after operation of any lower case key of the auxiliary keyboard to first operate the shift key and then the corresponding character key of said machine, means operable upon operation of any lower case key of the auxiliary keyboard after operation of any upper case key of the auxiliary keyboard to first operate the unshift key and then corresponding character key of said machine, means operable upon operation of any upper case key of the auxiliary keyboard after operation of any upper case key thereof to operate the corresponding character key of said machine, and means operable upon operation of any lower case key of the auxiliary keyboard after operation of any lower case key thereof to operate the corresponding character key of said machine.

17. An auxiliary keyboard for operating the keys of the keyboard of a tape-perforating machine having a plurality of character keys each producing the same characteristic tape perforation for upper case and lower case, a shift key for producing a characteristic upper case tape perforation and an unshift key for producing a characteristic lower case tape perforation, the auxiliary keyboard comprising a plurality of keys each marked with an upper case or lower case character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper and lower case keys of the auxiliary keyboard and being positioned to be successively engaged by the associated key on depression thereof, an electric circuit including the first contact member of each pair associated with an upper case key of the auxiliary keyboard and also including the winding of the shift key solenoid, an electric circuit including the second contact member of each pair associated with an upper case key of the auxiliary keyboard and also including the winding of the solenoid associated with the correspondng character key of the tape-perforating machine keyboard, an electric circuit including the first contact of each pair associated with a lower case key of the auxiliary keyboard and also including the winding of the unshift key solenoid, an electric circuit including the second contact of each pair associated with a lower case key of the auxiliary keyboard and also including the winding of the solenoid associated with the corresponding character key of the tape-perforating machine keyboard, means operable upon depression of either the shift or unshift key of the tape-perforating machine to open the circuit of the solenoid associated with the depressed key and to maintain said circuit open until depression of the other of the shift and unshift keys, means operable upon depression of the other of the shift and unshift keys to operate said means to close said opened circuit of the previously depressed shift or unshift key to permit completion of said circuit upon subsequent operation of a key of the auxiliary keyboard, switch means included in the circuit of the shift key solenoid, means operable by depression of the shift key to open said switch means, means operable by depression of the unshift key to close said switch means to permit completion of said circuit upon subsequent engagement of any upper case character key of the auxiliary keyboard with the first contact member associated therewith, a second switch means included in the circuit of the unshift key solenoid, means operable by depression of the unshift key to open said second switch means, means operable by depression of the shift key to close said second switch means to permit completion of said circuit upon engagement of any lower case character key of the auxiliary keyboard with the first contact member associated therewith, and a source of power for said electric circuits.

References Cited in the file of this patent

UNITED STATES PATENTS

| Number | Name | Date |
|---|---|---|
| 467,875 | Lungen | Jan. 26, 1892 |
| 540,949 | Clark | June 11, 1895 |
| 785,406 | Cochrane | Mar. 21, 1905 |
| 1,271,614 | Powers | July 9, 1918 |
| 1,278,089 | Ashley et al. | Sept. 10, 1918 |
| 1,753,991 | Langford | Apr. 8, 1930 |
| 2,019,864 | Lemmon | Nov. 5, 1935 |
| 2,107,030 | Dreher | Feb. 1, 1938 |
| 2,469,754 | Tierney | May 10, 1949 |
| 2,581,665 | Jarmann | Jan. 8, 1952 |